Nov. 26, 1957 J. A. SLOAN 2,814,304
VACUUM BREAKERS
Filed May 18, 1955

INVENTOR.
JAMES A. SLOAN
BY PARKER & CARTER
ATTORNEYS

United States Patent Office 2,814,304
Patented Nov. 26, 1957

2,814,304

VACUUM BREAKERS

James A. Sloan, River Forest, Ill., assignor to Sloan Valve Company, Chicago, Ill., a corporation of Illinois Application May 18, 1955, Serial No. 509,210

6 Claims. (Cl. 137—218)

This invention relates in general to vacuum breakers and the principal object of the invention is to provide a new and improved vacuum breaker for plumbing fixtures which will operate reliably under all conditions of water flow.

An object of the invention is to design a new and improved vacuum breaker which will operate to prevent leakage from the air inlets under all possible conditions including that of low inlet rates of water flow.

A further object of the invention is to provide a vacuum breaker in which both the inlet water seat and the air inlet seat, together with the valve closing member, are submerged in water during the operation of the valve member.

Another object is to provide a new and improved vacuum breaker having a float valve body provided with a valve member so arranged that when the float valve body is moved by water flow, it acts to pull the valve member closed on the air inlet seat rather than to push it, thereby more reliably preventing leakage through the air inlets.

Another object is to design a float valve body having a valve member and coacting valve seats so arranged that any turbulent water flow will not cause the float valve body to wobble or rock the valve member on the air inlet seat, thereby preventing leakage.

A still further object is to design a vacuum breaker in which the air inlet seat is spaced some distance from the air vents to reduce the possibility of dirt or other foreign matter from accumulating on the seat to cause leakage.

Another object is to arrange the air inlet seat in such a manner that it is flushed clean by the action of the water flow so as to reduce the possibility of leakage and also to prevent possible sticking of the valve member to the seat.

Further objects are to provide a new and improved vacuum breaker for preventing back-syphonage which is economical to produce, requires relatively few parts, is easy to assemble, is durable in construction, reliable in operation, and is leak-proof under all conditions.

Vacuum breakers of the type concerned with the present invention have utility where there is danger that back-syphonage can occur in a potable water supply system from a possible source of contaminated and polluted drainage. The devices are usually connected on the downstream side of control valves in plumbing systems where they permit flow from the pure water supply line into various kinds of plumbing fixtures, such as for example, sinks, lavatories, photo and X-ray tanks, shampoo sprays, hospital fixtures, etc., and are arranged to prevent the back-flow or back-syphonage of polluted water from the fixture into the pure water supply line. This back-syphonage is usually caused by a vacuum condition being present in the water supply line, due to heavy withdrawals of water in the system, or for any one of a number of other well known causes. The vacuum breaker under these vacuum conditions acts as a back-check to prevent reverse flow and in addition admits air into the plumbing fixture to break the syphonic action.

In prior types of vacuum breakers utilizing a float type of valve, it was the usual practice to arrange the water inlet seat on the bottom end of the float body and the air inlet seat on the top end of the body, some distance from the water inlet seat. These devices operated fairly satisfactorily to prevent back-syphonage and leakage as long as the inlet rate of flow was not too low and there was no appreciable back pressure on the outlet side of the vacuum breaker. However, when the inlet rate of flow was of a relatively low rate and some restriction was present on the outlet side, there was a tendency for the float valve to be insecure upon its seat and leakage from the air inlet often occurred. There was also the tendency during turbulent flow for the float valve member of these prior vacuum breakers to wobble or rock on the air inlet seat, thereby causing annoying leakage and occasionally some water damage to equipment and floors.

The present invention entirely obviates the above difficulties by providing a new and improved vacuum breaker in which the float has a single valve member arranged on its bottom end and in which the air inlet seat as well as the water inlet seat are located relatively close together on the bottom end of the device and with the valve member between them. Both valve seats as well as the valve member are totally submerged in water when water flows through the device and the arrangement is such that water flow has the effect on the float body of causing the valve member to be pulled upon the air inlet seat instead of pushed as formerly when the air inlet seat was on the top end of the float valve body.

With the foregoing and other objects in view, the invention consists of certain novel features of construction, operation and combination of elements which will be more fully described and illustrated hereinafter in connection with the attached drawings in which:

Fig. 3 is a cross-sectional top view of Fig. 1 taken along the line 3—3; while

Figure 1:
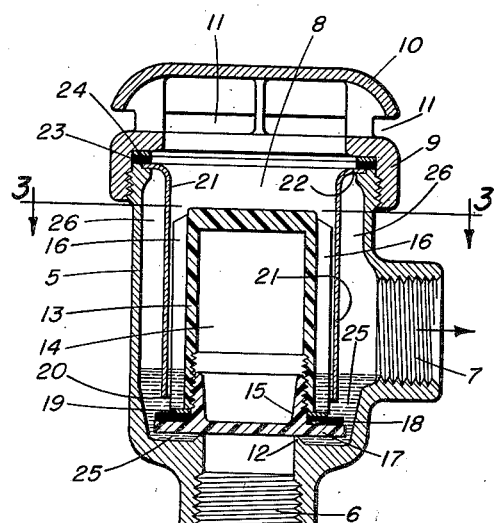
Fig. 1 is a cross-sectional elevation of a vacuum breaker embodying the features of the invention.
Figure 2:
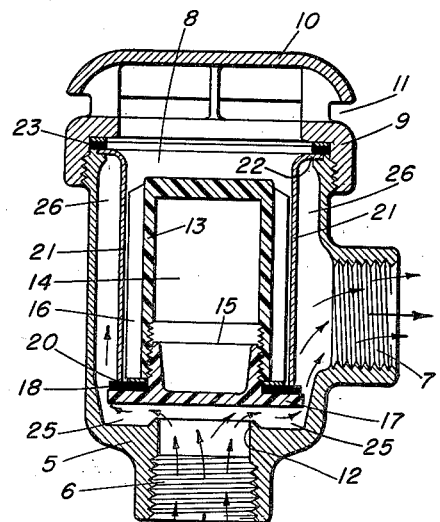
Fig. 2 is a cross-section elevation of the device shown operated and with water flowing through the passages.
Figure 3:
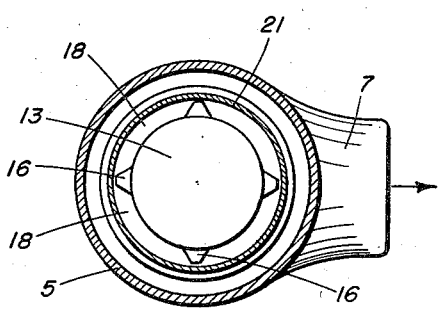

Referring now particularly to the drawings, Figs. 1, 2 and 3, the vacuum breaker of the invention comprises a hollow cylindrical body member 5, preferably constructed of brass and having a threaded inlet connection 6 for attachment of the water supply piping. A threaded outlet connection 7 is provided at the side of the casing 5 leading to any particular type of plumbing fixture which is to be protected by the device. At the top open end of the casing 5 there is an air inlet opening 8 axially in line with the water inlet opening 6. An enclosing cap 9 is provided for the air inlet 8, which is threaded to the top end of the casing 5, and is provided with a protective hood 10, which is attached to the cap 9 by means of spacing members, as shown. A series of air vents 11 between the cap 9 and hood 10 permit entry of air into the air inlet opening 8.

Surrounding the water supply inlet 6 at the bottom end of casing 5 is an upstanding annular valve seat 12, upon which the float valve body 13 normally rests as a unit. The float valve body 13 is hollow, as indicated at 14, and is preferably made of some light weight but strong material such as "Bakelite." It is closed as well as sealed at its lower end by the closing cap 15 threaded into the bottom end of the body. The float body 13 is further provided with a number of integrally formed guide wings 16 spaced around its circumference. The closure cap 15 is provided with an integral formed flanged portion 17 which constitutes the operating valve member of the float body. The valve member 17 normally rests on the water inlet seat 12 and is provided on its upper flanged surface with a rubber valve closure ring 18, which is clamped in position together with a slip ring 19 against the bottom of the valve body 13. The rubber ring 18 also serves as a water seal between the cap 15 and float body 13 where they thread together.

Also located adjacent the bottom end of casing 5 is an annular air inlet valve seat 20, which is spaced opposite the water inlet seat 12 and is adapted to be closed by the valve member 17 when the float body 13 rises. The air inlet seat 20 is formed at the lower end of a depending relatively thin tubular member 21, provided with an outwardly extending flange portion 22 at the top end, which is clamped to the top end of casing 5 by the rubber gasket 23 and slip ring 24 when the cap 9 is threaded onto the body.

It will be observed that both the water inlet seat 12 and the air inlet seat 20, together with the valve member 17, are arranged and located in the bottom end of the casing 5 and below the spill line of the water outlet 7. With this arrangement, there will always be some water retained in the well portion indicated at 25, so that both valve seats 12 and 20, as well as valve member 17, will be immersed in water regardless of whether the device is under operation or in normal condition as shown in Fig. 1. The space around the outside of tubular member 21, and indicated by reference character 26, serves as a chamber to trap a certain amount of air when the device is under operation.

The vacuum breaker is mounted in the vertical position, as shown, and is customarily arranged in association with any plumbing fixture at an elevation above the spill line of the particular fixture which it is to protect. Assume under ordinary conditions of operation that the control valve (not shown), which is customarily connected in the water supply line leading to the inlet supply connection 6, is opened up. The flow of water into the casing 5 due to its velocity will immediately force the float valve body 13 upwardly off the water inlet seat 12 and close the valve member 17 on the air inlet seat 20, as shown in Fig. 2. Water then flows around the outside of valve member 17, as indicated by the arrows, and partially upward in the chamber 26 on the outside of tubular member 21 and then directly outwardly through the outlet opening 7. Assuming there is no restriction in the fixture or connection leading from the outlet 7, this water flow continues as long as the control stop is open. When the control stop is shut off and the water flow ceases, the float body 13 immediately drops downward, so that valve member 17 again comes to rest upon the water inlet seat 12. The guide wings 16 help to guide the movements of the float body 13 in tubular member 21 and prevent sidesway or wobble of the valve member 17 between the valve seats.

It is particularly to be noted that prior and during this water flow, both water inlet seat 12 and air inlet seat 20, together with the valve member 17, are totally submerged in water flow. During water flow a small amount of water will rise in the chamber between the tubular member 21 and the outside of the float body 13 between ribs 15 without, however, rising sufficiently to cause leakage through the air inlet 8. The jet action of the flowing stream closes the valve member 17 on air inlet seat 20 almost immediately before any appreciable rise can occur.

An important advantage of having the valve seats and valve member operating under water is that there is no likelihood of the valve member 17 and its rubber seating member 18 vulcanizing or adhering to the air inlet seat 20 after long periods or high pressures during which the device may be in operation without shutting off the water flow.

A further advantage of arranging the valve seats and valve member close together at the bottom end of the device is that the float body would have less tendency to wobble or rock the valve member 17 on the air inlet seat 20 during turbulent or erratic flow of water from the inlet. This is particularly true under high pressure conditions. With the float rendered more stable under such conditions, there is no chance of leakage from the air inlet seat to the air outlet 8. Furthermore, the flow of water through the device, as indicated by the arrows, cannot pull the valve member 17 sideways off its seat 20 toward the outlet 7 along with the stream flow as formerly occurred to cause leakage.

Another important advantage accruing from the invention is that with the water inlet seat 12 and air inlet seat 20, as well as the valve member 17 submerged at all times, there is less likelihood of dirt or other debris accumulating on the air inlet seat 20 during periods of long disuse. The air inlet seat 20 being located an appreciable distance downward and away from the air inlet opening 8, precludes the possibility of dust, dirt, and even insects, from attaching themselves to the air inlet seat 20 and causing possible leakage. In connection with this particular advantage, since both the air inlet seat and the water inlet seat are immersed in water, the seats are washed or flushed clean at every operation of the device, so that it is virtually impossible for any dirt or foreign matter to become lodged on the seat.

The foregoing operation of the device takes place during ordinary flow of water. Assume now that some abnormal vacuum condition takes place in the water supply system during the operation of the device. This vacuum condition will cause the float body 13 to be sucked downward, so that the valve member 17 closes upon the water inlet seat 12, thereby acting as a back-check to prevent reverse flow from the possible contaminated fixture leading from the outlet 7. At the same time, the valve member 17 opens up air inlet seat 20, causing atmospheric pressure to enter the air inlets 11 and 8 around the outside of the float body 13 and the air inlet seat 20, thereby breaking the vacuum condition. The vacuum breaker, therefore, insures double protection for any fixture to which it is attached, the first being the back-check on water inlet seat 12 and the second being the breaking of the vacuum from the air inlet 8.

Assume now conditions which occur when X-ray developing tanks or other similar fixtures are used. An extremely low rate of flow is produced in the inlet water supply 6, so that the velocity of the water would not be sufficient to immediately raise the float body 13 and close valve member 17 on air inlet seat 20. The water will slowly rise under these conditions for a short distance in the space between the tubular member 21 and the outside of float body 13. However, if there is no appreciable restriction to the free flow of water through the outlet 7, the water will continue to rise around the float body 13 until it has assumed its buoyant condition, whereupon valve member 17 will close upon air inlet seat 20 to effectively seal off further flow of water and prevent leakage from air inlet 8.

With the above low inlet rate of flow assume now that some restriction is present on the outlet side of the device, such as would occur when a shampoo hose or an immersed outlet is connected to the device. This back pressure would likewise assist in building up the buoyancy of the float member 13 and cause it to more tightly seal the valve member 17 on air inlet seat 20 to prevent leakage. This restriction may also cause a rise of water in the chamber 26 surrounding tubular member 21, without causing leakage, because this chamber has no access to the outside atmosphere. A small amount of air will be trapped at the top of chamber 26 at this time without any results. The fact that the air seat 20 and valve member 17 are located at the bottom of casing 5 is an advantage under these conditions because the back pressure would immediately manifest itself upon the float body 13 to cause it to become buoyant and prevent leakage.

Under the above conditions should a vacuum condition now come on in the inlet supply line, the float body 13 immediately drops downward on the water inlet seat 12 while atmospheric air to break the vacuum condition, enters the air inlet 8 and around the air seat 20.

The invention may best be described as providing a float valve body in which the air inlet seat and water inlet seat, together with the valve member, are located close together at the bottom end of the float body and the action may be said to be that the float "pulls" the valve member on the air seat rather than "pushes" it, since the level of buoyancy is above the air inlet seat rather than below it.

Figure 4:
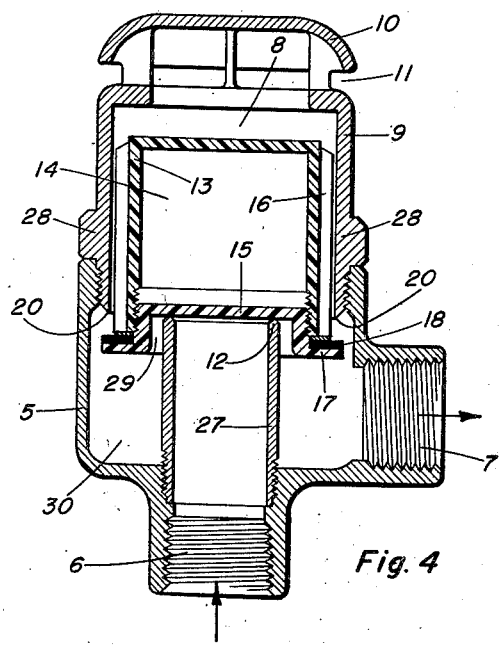
Fig. 4 is a cross-sectional view of a modified form of the vacuum breaker.

Referring now particularly to the modification shown in Fig. 4, this shows a float valve body 13 which is generally of the same construction as that of Fig. 1, with the exception that the water inlet seat 12 is provided on the end of a raised pipe extension 27 threaded into the bottom of the body 5 in the water inlet 6. The air inlet seat 20 is arranged on the bottom end of an extended portion 28 of cap 9, which is threaded into the top of body 20, and provided with a nut-shaped portion for application of a wrench. This modification does away with the chamber 26 of Fig. 1, as well as the tubular member 21, but raises the air inlet seat 20 and water inlet seat 12, together with the valve member 17, to the top side of the water outlet 7. The device operates exactly as that described in Figs. 1 and 2, except that the valve seats and valve members are not normally submerged in water when the device is not in operation. However, immediately upon entrance of water through the inlet 6 to cause the float body 13 to rise, water will surround both valve seats 12 and 20, as well as the valve member 17, and keep them immersed in the water as long as the flow takes place. When the water flow ceases, the valve member 17 again drops back on the water inlet seat 12 and opens air inlet seat 20. In this modification, during water flow, the valve seats and valve member are immersed in the water flow and flushed clean every time the device operates. In addition, the air seat is spaced some distance from the air inlet, so that there is less likelihood of dirt accumulating upon it. The tendency of the float body to wobble on its seat is likewise reduced with this arrangement, since there is provided a recess 29 in the member 15, which helps to center the valve member 17 on the seat 12 and helps to prevent the tendency of the water from pulling the valve member 17 sideways off its seat toward the outlet 7.

The invention having been described more or less specific as to details, including the modification thereof, it is to be understood that the same is not to be limited thereby, as various changes may be made in the arrangement and proportion of the parts and elements, and that equivalents may be substituted therefor, all without departing from the spirit and scope of the invention as set forth in the appended claims.

It will be understood that when, in the claims, I employ the term "a single valve member," I wish this language to be interpreted with sufficient breadth to include the lower portion of the float valve, whether the closure 15 is made in one piece or more than one piece, and whether or not the flange portion 17 is unitary with the closure 15 or with the cylindrical side 13 of the float valve body.

What is claimed is:

1. In a vacuum breaker, a vertical casing having a water inlet on one end and an air inlet at the other end, a water outlet at the side of said casing and between both of said inlets, a float valve in said casing having a body portion arranged between said water inlet and said air inlet, and a valve member carried by said float valve for selectively closing and opening said water inlet and said air inlet, both said water inlet and said air inlet together with said valve member being normally immersed in water and arranged in said casing below said water outlet.

2. In a vacuum breaker, a vertical casing having a water inlet on the bottom end and an air inlet on the top end, a water outlet at the side of said casing between said water and air inlets, a float valve in said casing having a body arranged between said water and air inlets, a valve seat around said water inlet at the bottom of said casing, said air inlet having an extended portion thereon projecting downward in said casing adjacent the bottom of said casing, a valve seat on said air inlet extended portion arranged directly opposite said water inlet seat, a valve seating member supported on the bottom of said float valve and adapted to seat on either said air inlet seat and said water inlet seat, both of said valve seats and said valve seating member arranged to be submerged in water retained at the bottom end of said casing when no water is flowing through said casing, said float valve body projecting upwardly into said air inlet extended portion, from a position adjacent said air inlet seat to a position adjacent said air inlet at the top of said casing.

3. In a vacuum breaker, a vertical casing having a water inlet on the bottom end and an air inlet at the top end, a water outlet at the side of said casing and between both of said inlets, a float valve in said casing having a body portion positioned between said water inlet to said air inlet, valve seats around said water inlet and said air inlet arranged below said water outlet, and a valve member carried on the bottom end of said float valve body for selectively closing and opening said water inlet and said air inlet, said valve member also being located in said casing for movement below the position of said water outlet in the side of said casing, both said water inlet seat and said air inlet seat together with said valve member being normally immersed in water below the level of said side water outlet.

4. In a vacuum breaker, a cylindrical casing having a water supply inlet on the bottom end thereof and an air inlet on the top end, a water outlet on the side of said casing and betweeen said inlets, a cylindrical float valve body in said casing, a valve seat for said water inlet and another valve seat for said air inlet, both of said valve seats being located at the bottom end of said casing and opposite each other, a valve member on the bottom end of said float valve body arranged between said water and air inlet seats and adapted to close upon either of them, a tubular member in said casing supported upon the upper end of said casing and surrounding said float valve body to guide the same, said air inlet seat being formed upon the lower end of said tubular member, both of said valve seats and said valve member being normally immersed in water retained in the bottom of said casing below the level of said side outlet, whereby said valve member always closes and opens on said valve seats while in a submerged condition.

5. In a vacuum breaker, a cylindrical casing having a water supply inlet on the lower end thereof and an air inlet at the top end, a water outlet at the side of said casing and between said inlets, a cylindrical float valve body in said casing, a tubular member in said casing surrounding said float valve body and supported at its upper end from the top end of said casing, the lower end of said tubular member extending downward to a position opposite said water supply inlet, an air inlet seat formed around the lower end of said tubular member, a water inlet seat formed around said water supply inlet, both of said seats being opposite one another, a valve member supported on the bottom end of said float valve body and arranged between said air and inlet seats to open and close on either of them, there being a well portion formed in the bottom of said casing between the walls of said casing and said float valve body when said float valve member is normally resting on said water inlet seat, said well portion also being located below the level of said water outlet to normally retain water therein, said air and inlet seats and said valve member being at all times submerged in the water and said casing well, whereby said seats are closed and opened under water, and a cap member on top of said casing having air vents leading into said air inlet.

6. In a vacuum breaker, a hollow casing having a water supply inlet at the bottom end and an air inlet at the top end thereof, a water outlet on the side of said casing between said inlet, a float valve body in said casing having a sealed hollow body and a flanged portion on its lower end extending outwardly from said float valve body and constituting a valve member, a valve seat for said water inlet and another valve seat for said air inlet, both of said valve seats being located on the bottom end of said casing and opposite each other, said valve member being located between both of said seats and normally resting on said water inlet seat and adapted to close upon said air inlet seat upon water flow, there being a well portion formed in the lower end of said casing below the level of said water outlet and between the walls of said casing and said float valve body when said float valve member is normally resting on said water inlet seat, whereby a quantity of water is always normally trapped in said casing, both said air and water inlet seats together with said valve member being located in said casing well portion and wholly submerged in water both normally and during water flow, said float valve body being normally disposed above said well portion, the amount of water in said well portion being insufficient to cause said float valve body to become buoyant, said float valve body and said valve member being projected upwardly by normal water flow to open said valve member from said water inlet seat and to close it upon said air inlet seat, said float valve body being rendered buoyant on low rates of water supply from said water inlet when back pressure is built up in said water outlet to thereby close said air inlet seat.

References Cited in the file of this patent

UNITED STATES PATENTS

| | | |
|---|---|---|
| 1,363,535 | Rollins | Dec. 28, 1920 |
| 2,282,188 | Horne | May 5, 1942 |
| 2,314,071 | Bucknell | Mar. 16, 1943 |
| 2,328,382 | Langdon | Aug. 31, 1943 |
| 2,472,933 | Anderson | June 14, 1949 |
| 2,590,386 | Dobrick | Mar. 25, 1952 |
| 2,693,198 | Heath | Nov. 2, 1954 |

FOREIGN PATENTS

| | | |
|---|---|---|
| 211,511 | Germany | July 3, 1909 |